United States Patent [19]

Raab

[11] Patent Number: 5,550,489
[45] Date of Patent: Aug. 27, 1996

[54] SECONDARY CLOCK SOURCE FOR LOW POWER, FAST RESPONSE CLOCKING

[75] Inventor: Michael L. Raab, Fremont, Calif.

[73] Assignee: Quantum Corporation, Milpitas, Calif.

[21] Appl. No.: 536,314

[22] Filed: Sep. 29, 1995

[51] Int. Cl.⁶ .............................................. H03K 19/096
[52] U.S. Cl. ................. 326/93; 326/9; 327/147; 327/276
[58] Field of Search ............ 326/9, 93, 95–96; 327/141–142, 144–145, 147, 276

[56] References Cited

U.S. PATENT DOCUMENTS

| 4,941,151 | 7/1990 | Abbiate et al. | 327/276 X |
|---|---|---|---|
| 4,970,418 | 11/1990 | Masterson | 327/276 X |
| 5,208,557 | 5/1993 | Kersh, III | 331/57 |
| 5,233,316 | 8/1993 | Yamada et al. | 331/45 |
| 5,418,822 | 5/1995 | Schrachter et al. | 326/93 X |
| 5,469,116 | 11/1995 | Slemmer | 326/96 X |
| 5,471,176 | 11/1995 | Henson et al. | 331/1 A |
| 5,488,325 | 1/1996 | Sato et al. | 326/93 X |

*Primary Examiner*—David R. Hudspeth
*Attorney, Agent, or Firm*—David B. Harrison

[57] ABSTRACT

An integrated digital logic circuit includes a free-running secondary clock oscillator for generating free-running clocking pulses and a frequency-stabilized master oscillator for generating primary clocking pulses. A clock signal selector selects and puts out either the secondary clocking pulses or the primary clocking pulses depending upon integrated circuit operations/applications. A method for rapidly generating clocking signals during an integrated circuit start-up interval is also described.

22 Claims, 3 Drawing Sheets

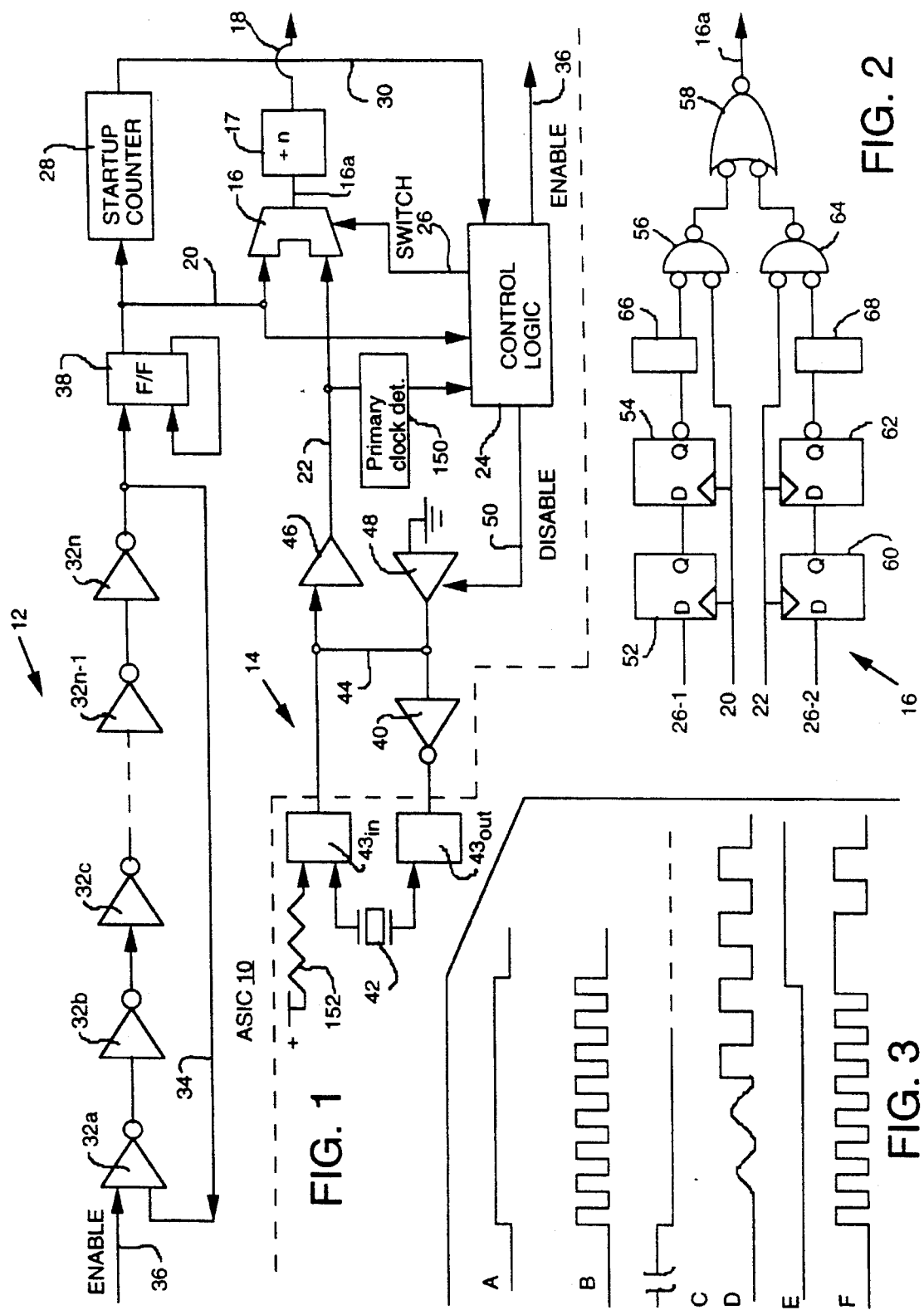

SECONDARY CLOCK SOURCE FOR LOW POWER, FAST RESPONSE CLOCKING

FIELD OF THE INVENTION

The present invention relates to digital clock signal generation. More particularly, the present invention relates to including a rapidly starting secondary clock generator within an integrated circuit for providing benefits and features not available with a primary frequency-stabilized master oscillator within the integrated circuit.

BACKGROUND OF THE INVENTION

There is a need in new portable and low-power computing systems to save power wherever possible, with minimal sacrifice of system response-time and performance. One common method of power-saving is to stop the system clocks, and further, to stop any associated clock oscillators, because clocks and oscillators, and circuits driven by them, consume considerable power. System clocks and associated clock oscillators are used primarily to establish time bases by which logical processes within digital circuits are carried out. For systems which require high-accuracy clock frequencies, crystal oscillators or high-Q ceramic resonators are used to generate precise system clocks.

Crystal oscillator and ceramic resonator devices have several issues involved with their use. First, the oscillation may not be reliable or stable during clock-generator startup, either during a power-on reset (POR), or restarting of oscillation when exiting reduced power "sleep mode". Second, the power-efficiency may not be as good as with other clock generation methods. Third, if the system clocks are to remain off during clock-generator startup, there needs to be a method to detect when the clock startup sequence or procedure is complete. One method would be to impose a time delay upon other processing until the clock has stabilized, the delay being of sufficient duration to ensure clock stability; however, measurement of the delay is problematic in the sense that the most readily available time base for measuring such a delay is the clock generator itself, and it will not be stabilized or otherwise available during its initial startup interval.

Alternative techniques, such as resistor-capacitor (RC) discharge techniques, are coarse, and they require an external resistor-capacitor network and connection pin of an application specific integrated circuit (ASIC). In addition, it should be noted that POR delay circuits may not be applicable to oscillator startup when exiting from a sleep mode, since a system or ASIC full reset may not be desired; and, unlike cycling of the system power supply which does produce sufficient delay, the signal which ends sleep-mode may not be of sufficient duration to discharge a simple RC POR circuit.

Finally, startup time of system clock generators may be long enough to delay system response, hurt system performance, and unnecessarily waste power while the system is waiting for the clock generator to stabilize.

A second clock generator could be used to address the issues surrounding crystal oscillators and ceramic resonator devices, but it is desirable that the second clock generator would add little or virtually no cost to the system, and would consume little or no space within the system, e.g. on a printed circuit board. There are many tasks which can be handled while the primary clock source is shut down or starting up, which do not require the full accuracy of the primary clock source. Temporary or intermittent operation of the second clock generator may be crucial in systems where processing tasks cannot wait until the primary clock source has started-up and stabilized. Also, desirably, the second clock source should impose shorter startup times and greater oscillation power efficiency, resulting in further power savings. A hitherto unsolved need has remained for a secondary clock generator which satisfies these desirable requirements.

SUMMARY OF THE INVENTION WITH OBJECTS

One object of the present invention is to provide a rapidly starting, low power, less accurate secondary clock generator for use with low power digital computing equipment in lieu of a more precise, higher power primary clock source in a manner overcoming limitations and drawbacks of the prior art.

Another object of the present invention is to provide a secondary, inexpensive and less accurate clock source to handle clock generation tasks when very short startup/shutdown times and high oscillation power efficiency are required, and when operation of a primary clock source cannot or should not be used.

A further object of the present invention is to implement a rapidly starting, lower power and less accurate secondary clock generator within an ASIC in addition to a primary clock source in order to provide reduced power consumption and start-up delay attributable to clock generation within the ASIC.

One more object of the present invention is to implement a low power, fast response time clock generator for use within a low power ASIC for handling intermittent processing tasks or initial processing tasks immediately following recovery from a powered down sleep mode.

Yet another object of the present invention is to provide a simplified, low power control structure for synchronously switching between an interim, rapidly starting, lower power and less accurate secondary clock generator and a crystal controlled master oscillator within an ASIC in a manner overcoming limitations and drawbacks of the prior art.

One more object of the present invention is to provide simple digital clock sensing circuitry within an ASIC which automatically determines if a primary precise clock source is fully implemented and operating thereby to control switching from a secondary clock source to the primary clock source should switchover become desirable.

Yet another object of the present invention is to provide simple digital test circuitry within an ASIC which facilitates external testing of circuit elements comprising a crystal controlled master oscillator and a less accurate secondary clock generator.

Accordingly, a method in accordance with principles of the present invention, for rapidly generating clocking signals with clocking circuitry of a digital logic circuit during a clock recovery interval and thereafter, comprises the steps of:

applying a clock enable signal to the clocking circuitry, generating and putting out secondary clocking pulses from a free-running secondary clock oscillator within the clocking circuitry during the clock recovery interval, generating primary clocking pulses from a frequency-stabilized master oscillator within the clocking circuitry during the recovery interval and thereafter, timing duration of the recovery interval by reference to the secondary clock pulses, selecting and putting out the primary clock pulses following the recovery interval.

Further, in accordance with principles of the present invention, a clocking circuit for rapidly generating clocking signals within a digital logic circuit during a clock recovery interval and thereafter, comprises:

a free-running secondary clock oscillator within the clocking circuit for generating secondary clocking pulses during the clock recovery interval in response to a clock enable signal, a frequency-stabilized master oscillator within the clocking circuit for generating primary clocking pulses from during the recovery interval and thereafter during a subsequent operational interval, a timer within the clocking circuit for timing duration of the recovery interval by reference to the secondary clock pulses, and a clock signal selector controlled by the timer and connected to the secondary clock oscillator and to the frequency-stabilized master oscillator for selecting and putting out the secondary clocking pulses during the recovery interval and for selecting and putting out primary clocking pulses during the subsequent operational interval, without glitches during a switching interval.

Yet further, in accordance with principles of the present invention, an integrated circuit implements a clocking circuit comprising:

a free-running secondary clock oscillator for generating free-running clocking pulses, electronics for implementing with the aid of an external frequency setting element a frequency-stabilized oscillator for generating frequency-stabilized clocking pulses, oscillator detection circuitry for detecting operation of the frequency-stabilized oscillator, and selection circuitry responsive to the oscillator detection circuitry for selecting the frequency-stabilized clocking pulses in lieu of the free-running clocking pulses.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1 is a functional block diagram of a ring oscillator/crystal oscillator clock source in accordance with principles of the present invention.

FIG. 2 is a functional block diagram of a clock switch multiplexer for use within the FIG. 1 architecture.

FIG. 3 is a series of waveform graphs illustrating operation of the FIG. 1 oscillator.

DETAILED DESCRIPTION OF A PREFERRED EMBODIMENT

Figure 4:
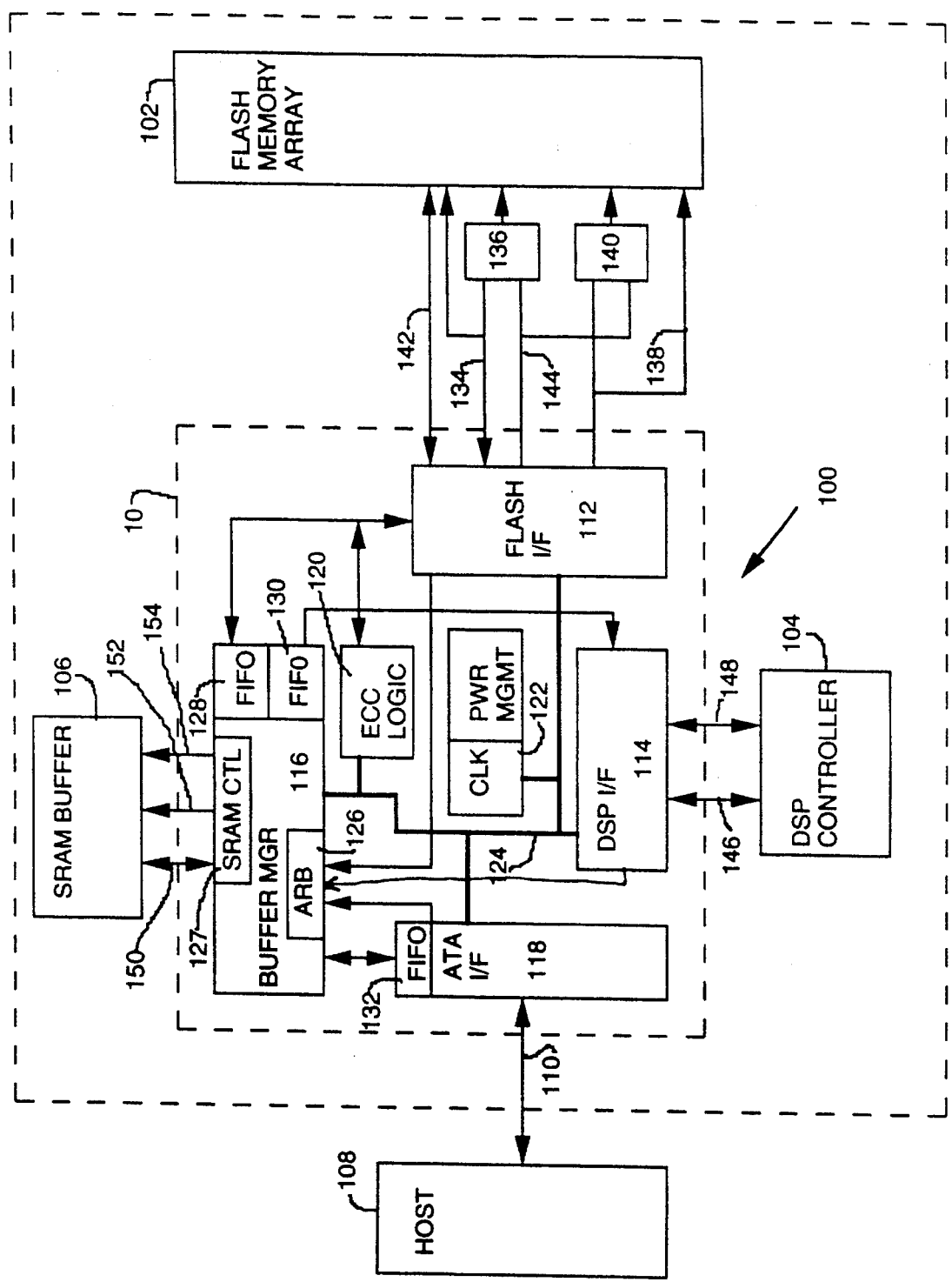
FIG. 4 is a functional block diagram of a PCMCIA flash memory card having an ASIC including a clocking circuit and control structure implementing principles of the present invention.

With reference to FIG. 1, an ASIC 10 includes an integrated on-board clocking circuit 12 (FIG. 3) having two clock generator circuits: one of them being a ring oscillator secondary clock source 12, and another of them being a crystal-controlled master oscillator 14. A glitchless multiplexer 16 provides a clock output on a path 18 to clock the circuitry composing the ASIC 10 by selecting without glitches between secondary clocking pulses on an output path 20 from the ring oscillator 12 and frequency-stabilized primary clocking pulses on an output path 22 from the crystal oscillator 14. A control logic circuit 24 provides a clock-synchronized switching control signal to the glitchless multiplexer 16 via a control path 26. The multiplexer 16 is preferably "glitchless" by design. A divide-by-n counter 17 may be interposed within the clock output path 16a to reduce the output clocking frequency to a desired rate.

One glitchless multiplexer design may be realized by using an AND-OR gate multiplexer, wherein the AND gate enables are properly synchronized to the signals being gated. A clock switching multiplexer 16 example is given in FIG. 2 wherein the output path 20 from the ring oscillator 12 clocks two D flip-flops 52 and 54 connected in tandem. The flip-flops 52 and 54 effectively synchronize a ring oscillator clock enable signal 26-1 to the ring oscillator clock. The synchronized ring oscillator clock enable signal 26-1 is applied to one input of an AND gate 56. The AND gate 56 also receives as a second input the ring oscillator clock signal on the path 20. An output of the AND gate 56 provides one input to an OR gate 58 which puts out the selected clock signal on the path 16a. A clock signal from the crystal oscillator 14 on the path 22 clocks two additional D flip-flops 60 and 62 which serve to synchronize a crystal clock enable signal 26-2 to the crystal oscillator clock signal. The synchronized crystal clock enable is applied to one input of a second AND gate 64. The AND gate 64 also receives as a second input the crystal oscillator clock signal on the path 22. An output of the AND gate 64 provides a second input to the OR gate 58.

The FIG. 2 multiplexer circuit 16 assumes that the enable signals 26-1 and 26-2 are not synchronized to either clock output 20 or 22, which is true if the control logic circuit 24 operates off of both clocks 12 and 14 at various times. Switching hazards are eliminated by having a rising edge of each clock output 20, 22 turn off the clock gate 16 when the rising-edge-triggered flip-flops may change state. The FIG. 2 circuit does not show how the two enable signals 26-1 and 26-2 can be related to each other in order to increase switching automation. A "break-before-make" gap of 2-3 clock periods is caused by enabling the crystal oscillator path 22 some delay interval after the ring oscillator path 20 is de-asserted. This delay may be automated by using logic to relate the ring oscillator and crystal oscillator gating signals 26-1 and 26-2, or handled by appropriate signal sequencing within the control logic block 24. Graph E of FIG. 3 illustrates a synchronized single switching control signal put out by the control logic block 24 over a single control path 26. Optional delay buffers 66 and 68 may be interposed between the flip-flops 54, 62, and the gates 56, 64 respectively. The delay buffers 66 and 68 provide additional timing margin.

Returning to FIG. 1, a startup counter 28 is clocked by the output pulses of the ring oscillator 12 on the path 20. When a predetermined count of ring oscillator clock pulses has been reached, the startup counter 28 puts out a control pulse over a path 30 to the control logic circuit 24 to signal that the master crystal oscillator has reached stability and switchover to the master crystal oscillator 14 is appropriate. The control logic 24 monitors the secondary clock pulses on the path 20 and the primary clock pulses on the path 22, e.g. via an optional primary clock detector 150 explained hereinbelow, and may synchronize the switching control signal SWITCH on a path 26 to the multiplexer 16. However, synchronization within the control logic block 24 is not required, as the multiplexer 16 is self-synchronizing, as previously explained. The multiplexer 16 switches the output path 16a to the primary clock pulses on the path 22 without generating any glitches. As used herein, "glitch" means the presence of a pulse or spike present during the clock switchover interval which has a period shorter than the shortest one of the secondary clock pulse period and the primary clock pulse period; and, conversely, the term "glitchless" means that no glitch is present during the clock switchover interval.

The ring oscillator 12 is comprised of e.g. an odd plurality of gates, such as gates 32a to 32n, at least one of which is an inverter gate, as shown in FIG. 1. A path 34 feeds back the output from the last gate 32n to an input of the first gate 32a, causing the ring of gates 32 to oscillate at e.g. 80 MHz. The first gate 32a is most preferably a NAND gate, having two inputs, the feedback input connected to the path 34, and an ENABLE input path 36. When the ENABLE input path 36 is asserted true, a resultant edge propagates through the chain of gates 32. Because of the inversion, the ring oscillator circuit 12 is astable, and oscillation immediately ensues.

The oscillation period (time domain) or frequency (frequency domain) is a function of the signal propagation or edge transit delays through the gates 32. Thus, in the embodiment of FIG. 1, ring oscillator frequency is selected by the number of gates 32. While a series of gates 32 are shown in FIG. 1, those skilled in the art will appreciate that a delay element could be substituted for a number of the gates. For example, one ASIC design cell may be a delay element having e.g. a six nanosecond delay, whereas one of the inverter stages 32 may have a delay of 0.25 nanosecond. Thus, it would take 24 inverter stages 32 to provide a pulse transit delay which would be equivalent to the delay provided by the 6 ns delay cell.

The closed loop path delay of gates 32a to 32a equals one half of the fundamental ring oscillator clock period. In this context, the term "fundamental" refers to the oscillation frequency of the ring oscillator 12 before any flip-flop division occurs, as at flip-flop 38. Frequencies throughout the ring oscillator path should be kept as low as possible, and reduced down to the crystal oscillator value as early in the circuit 12 as is practical, in order to minimize electromagnetic interferences (EMI), cross-talk, and power supply noise effects. A divide-by-n counter 17 may optionally be added in the output path 16a leading from the multiplexer 16 in order to provide low power modes by enabling reduction of the system clock frequency (the system power dissipation being proportional to system clock frequency). By placing this optional divider-counter 17 at the output of the multiplexer 16 rather than at the output of the ring oscillator flip-flop 38, the reduced frequency/reduced power benefit may be realized from either the ring oscillator 12 or the crystal oscillator 14. In some situations it may be desirable to provide the divider 38 with a divide-by-n function enabling the ring oscillator 12 to be "tuned" to a desired output clock frequency.

The ring oscillator 12 is designed to ensure that the frequency at its output path 20 does not exceed the output frequency from the crystal oscillator 14 on the path 22. Effects from temperature, voltage, semiconductor process variations and simulation modeling inaccuracies are taken into account in the design of the oscillator 12 to ensure adequate tolerance margins. Also, the delay count reached by the startup delay counter 28 may made long enough to cover the crystal oscillator startup worst case condition.

At least one flip-flop 38 has a clocking input connected to the feedback path 34 at the output of the last gate 32n. The flip-flop 38 performs two important functions: it divides the ring oscillator frequency in half, and it provides essentially equal duty on-off intervals during each resultant clock period. Because the oscillation frequency of the ring oscillator 12 is divided in half by the flip-flop 38, fewer delay gates (or delays) are required to obtain an equal duty cycle secondary clock signal on the path 20, thereby reducing overall implementation gate count and further slightly reducing power consumption. More than one flip flop may be provided to reduce the secondary clock signal.

The crystal oscillator 14 is conventional. It includes an inverter stage 40 having an externally mounted crystal 42 in series within a feedback path 44 and connected via output pad $43_{out}$ to input pad $43_{in}$. Connected in the feedback path 44 in addition to the inverter 40 are a clock buffer 46 which buffers and amplifies the master clock and puts it out on the path 22 to the multiplexer 16, and a tri-state buffer 48 which e.g. grounds the feedback path 44 in response to assertion of a DISABLE logical control signal on a control path 50.

Operation of the clocking circuitry of FIG. 1 may be further appreciated upon considering the waveform graphs of FIG. 3. Graph A represents the ENABLE signal present on the path 36. Assertion of the ENABLE signal on the path 36 marks the start of either a power-on reset operation in which the registers of the ASIC 10 are initialized, or a sleep-mode recovery interval, during which previously stored values are held in the ASIC's registers. Upon assertion of the ENABLE signal (shown as a logical transition from zero to one in graph A), an edge propagates through the series of gates 32 and results in immediate oscillation of the ring oscillator 12, as previously explained. This oscillation of the ring oscillator 12 is shown as graph B of FIG. 3.

Typically, at the same time that the ENABLE signal edge occurs in the graph A waveform, the DISABLE signal on the path 50 is de-asserted, as shown in graph C of FIG. 3. De-assertion of DISABLE causes the tri-state buffer 48 to return to a floating state, which removes the clamp from the feedback path 44 of the crystal oscillator 14. However, full oscillation is not an immediate result. As shown in graph D of FIG. 3, oscillation begins at an uncertain time, and as an analog waveform, until the inverter 40 reaches saturation condition.

As the crystal oscillator 14 proceeds toward the saturated condition, the startup counter inhibits use of the crystal oscillator. The startup counter is designed to ensure sufficient time for the crystal oscillator 14 to stabilize. When the startup counter reaches the terminal count (i.e. after the predetermined delay interval), the crystal oscillator output on path 22 is selected by the clock switch multiplexer 16 as the system clock. This is accomplished by the multiplexer 16 performing a "break-before-make" switching operation, where the ring oscillator clock 20 is gated-off before the crystal oscillator is gated-on at the output 16a. This method of clock switching is designed to ensure that the gap between the last edge from the ring oscillator 12 and the first edge from the crystal oscillator 14 will be greater than the new clock period, thereby preventing any glitch condition as previously defined. This clock switch method (and circuit described in FIG. 2) will work with clock sources of dissimilar frequency and phase, such as may be inevitable in many practical applications. As shown in the waveform graphs of FIG. 3, an output gap of two or three crystal oscillator periods attends switchover from the ring oscillator 12 to the crystal oscillator 14 via the clock switch 16.

Once a glitchless switchover has occurred, the ring oscillator 12 may be stopped by de-asserting the ENABLE control on the path 36, as shown by the falling edge of graph A of FIG. 3. If the output 20 from the ring oscillator 12 is gated-off by the multiplexer 16 following switchover to the crystal oscillator 14, then the stopping of the ring oscillator 12 need not be glitch-free, as the glitch will not be seen by any system logic downstream of the clock output 19. Alternatively, stopping of the ring oscillator 12 may be accomplished synchronously by the control logic 24 in order to prevent glitching or pulse narrowing from occurring. (Whether the ring oscillator shut-down is or is not glitchless depends upon individual design considerations and applications). Starting the ring oscillator 12 is self-synchronous, since at ring oscillator startup no other clocks are available. It should be noted that the control logic 24 may also need a clock to run, particularly if it contains some form of sequencing state machine. Evidently, the clock source for the control logic 24 would be the ring oscillator in many cases, depending upon particular designs. Whether the control logic 24 will switch over to the clock oscillator 14 at times will depend upon particular design requirements and choices.

Those skilled in the art will appreciate that a secondary clock oscillator, such as the ring oscillator 12, achieves a number of worthwhile advantages over the crystal master oscillator 14. These advantages include low cost implementation with a minimum number of cells of an ASIC, greater power efficiency, and faster startup response. The dual clock circuitry of FIG. 1 enables generation of a system clock to handle tasks during a powered-down sleep mode such as relaying of peripheral status of e.g. a flash memory card 100 to a host 108 via a PCMCI interface 110 during a status response interval without need for even applying power to the primary crystal oscillator 14. Another example is receiving and servicing a host request for access to a buffer RAM 106 of the flash memory card 100 illustrated in FIG. 3, wherein the card includes a RAM buffer 106 in addition to a flash memory EEPROM array 102 without need to start up the crystal controlled oscillator 14.

Also, the rapid-startup secondary clock source 12 enables the startup of the crystal oscillator 14 to be delayed and switchover to the crystal-stabilized clock to occur after a delay sequence timed by e.g. the counter 28 being clocked by the secondary clock source 12, thereby preventing system clocks from being driven from the primary clocking source 14 until it is stable. The secondary clock source 12 also enables handling of any tasks which require prompt response but which do not require a highly accurate timebase, and can be implemented with lower power consumption than the power required for the primary clock 14.

In some system implementations it may be sufficient merely to start up the crystal-controlled clock source 14 to calibrate and adjust the frequency of the secondary clock source 12 to increase its accuracy, as by adjusting the number of delay stages 32 of the ring oscillator illustrated in the FIG. 1 embodiment. In this regard, the reader is referred to commonly assigned, copending Henson et al. U.S. patent application Ser. No. 08/255,162, filed Jun. 7, 1994, entitled: "Frequency Adjustable Ring Oscillator", now U.S. Pat. No. 8,471,170, the disclosure thereof being incorporated herein by reference. After calibration, the crystal oscillator 14 can be shut down until needed for further or subsequent calibration processes. While a ring oscillator 12 has been described as a presently preferred example of a secondary oscillator, other low cost, low power oscillators, such as resistor-capacitor or inductor-capacitor time delay oscillators, may be employed.

FIG. 4 illustrates an example of a PCMCIA flash memory card 100 which includes an ASIC 10 having the clocking/power management circuitry 122 in accordance with the present invention. In addition to the controller ASIC 10, the flash memory card 100 includes the flash memory array 102, a digital signal processor (DSP) microcontroller 104, a static random access memory (SRAM) buffer memory 106, and the host computing system 108, which is connected to the card 100 via an ATA standard PCMCIA interface circuit 110. The flash memory array 102 is connected to a flash interface 112 which provides addressing, control and data paths to and from the array 102. The DSP microcontroller 104 is connected to a DSP interface 114. The SRAM buffer 106 is connected to a buffer manager 116, and the host computer 108 is connected by the PCMCIA interface 110 to an ATA interface 118. The controller ASIC 10 also includes ECC logic 120, and the clock/power management circuit 122 which incorporates principles of the present invention. An internal bus structure 124 interconnects the flash array interface 112, DSP interface 114, buffer manager 116, ATA interface 118, ECC logic 120 and clock/power management circuit 122, as shown in FIG. 4.

An arbitration circuit 126 within the buffer manager 116 resolves contention for SRAM resources between the flash array interface 112 and the ATA interface 118. The DSP interface provides the DSP 104 with one direct input to the arbitration circuit 126. Another input to the arbitration circuit comes from the ATA interface 118. A third input to the arbitration circuit comes from the flash memory interface 112.

An SRAM control circuit 127 connects to the SRAM buffer via a data bus 150, address bus 152 and control bus 154. The buffer manager also includes a flash array first in/first out buffer (FIFO) 128, and a microcontroller FIFO 130; and, the ATA interface circuit 118 includes a host FIFO 132. A data bus structure 134 and data latch 136, an address bus structure 138 and address latch 140, and a control path 142 extend between the flash memory array 102 and the flash interface 112. The flash interface 112 generates and puts out an address latch enable signal over a path 144 to the latches 136 and 140. A data bus 146 and an address/control bus 148 also extend between the DSP microcontroller 104 and the DSP interface 114.

The power management function within the circuit 122 performs two functions. The first function is to help control the maximum peak power requirements on the PCMCIA host 108 which supplies all operating power to the card 100. Maximum peak power requirements are controlled by scaling down the internal clock within the ASIC 10, and reducing the clocking rate of the DSP microcontroller 104. A nominal full clock speed is 40 MHz for the ASIC 10. Scaled clocks are selectable at e.g. 20 MHz, 10 MHz, and 5 MHz. Default clock rate at power-on is 5 MHz. Clock speed selection is under control of a firmware control program executed by the DSP microcontroller 104. Power consumption is related directly with clock speed, although not exactly linearly, due to the power consumption of the flash memory array 102.

A second function of power management within the circuit 122 is to reduce power consumption when the card 100 is not active. Two degrees of power reduction are possible, including standby mode and sleep mode. In standby mode a reduced power consumption is achieved by turning off most of the clocks on the card 100. In this mode power consumption will be on the order of approximately 10 milliamperes, but the card 100 is able to start up operations almost instantaneously. The standby mode is controlled by a power management control routine executed by the DSP microcontroller 104. On power up, standby mode is disabled.

In sleep mode, to achieve lowest power consumption, the ASIC oscillator circuitry is stopped. On power up following sleep mode as when the card 10 recognizes a host access request as by detecting receipt of a host command at the ATA interface 118 and causing the control logic 24 to generate the ENABLE signal for starting the secondary oscillator 12. The resultant secondary clocking signal enables the decoding and command processing circuits of the card 100 to be clocked and thereupon respond to the host request for access e.g. to the SRAM buffer 106. Simultaneously, the crystal-controlled primary oscillator 14 is restarted. After the primary oscillator 14 has stabilized, switchover to the primary clocking signal occurs, and the secondary oscillator 12 is disabled. With this approach, sleep mode will consume less than about 1 milliampere, while recovery from sleep mode will be very rapid.

In summary, the present invention may be generalized to comprise a clock array including a crystal oscillator clock source and an independent ring oscillator clock source, either or both of which are called upon during system operation depending upon the relative strengths and benefits of each. Any or both clock sources 12, 14 which are not required at any time may be shut down.

Strengths of the ring oscillator source 12 include low power oscillation; zero-power stop mode; instant, simple, reliable start/stop oscillation; a low cost bill-of-materials with no external components being required such as a crystal or external resistor-capacitor period-setting elements; reliable and consistent start-up without analog or external components or any special input or output buffers being required; and higher mean-time-between-failures (MTBF), since there are no external components or wiring, no noise-sensitive high-impedance nodes, and no electromechanical components such as a crystal resonator.

Strengths of the crystal oscillator 14 include high frequency accuracy; accurate, fixed performance specifications, such as 10 Megabytes per second, while holding worst-case IC clock frequencies to a minimum for any given minimum level off specified performance; and, reliability premised upon a historically-proven solution. Since the ring oscillator 12 may be added to the crystal oscillator 14, both clock sources may be made available to leverage off of the strengths of each design, depending upon particular design requirements.

The present invention combines known elements such as the ring oscillator 12 and the crystal oscillator 14 in a manner enabling each or both to be used to maximum advantage and overall system benefit. For example, a product could be designed with both the ring oscillator 12 and the crystal oscillator 14 (except for external crystal) implemented within an application-specific (or standard product) integrated circuit (IC). The crystal oscillator support would be present on the IC in the event that the crystal oscillator benefits were needed in a circuit design, in which case the crystal 42 would be installed with the IC on a circuit board and the crystal oscillator 14 enabled. However, a design goal would be not to implement the crystal oscillator unless it were needed, in order to save cost and power. Accordingly, the crystal oscillator 14 would not be implemented in circuits relying upon the ring oscillator 12, if the performance and accuracy of the ring oscillator 12 is sufficient for all versions of the ultimate product, or for low cost versions of the ultimate product.

In the instance where the crystal oscillator is omitted in mass production of the ultimate product (but still available within the IC), the following changes may be made to support this option:

a. an external clock would be injected into the crystal oscillator input pin during manufacturing, in order to perform any ring oscillator tuning or calibration;

b. an external resistor would be connected to the crystal oscillator input pin (in lieu of the crystal oscillator components) to tie off the circuit input to an inactive state (this tie-off alternatively could be accomplished by some circuit paths or elements internal within the IC); and c. a crystal oscillator detector circuit could be added to the IC design to automatically detect the presence or absence of the crystal oscillator implementation, without need for any firmware changes or additional programming pins.

Figure 5:
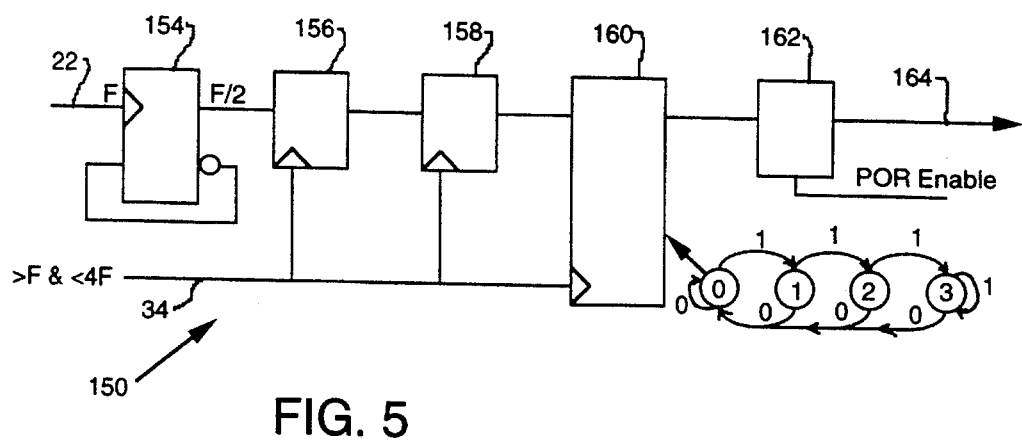
FIG. 5 is a functional block diagram of a crystal oscillator detector circuit for detecting functional presence of the crystal oscillator clock source illustrated in FIG. 1.

One such detector circuit 150 is shown in FIG. 5. Therein, the crystal oscillator input pin 43in is either connected to the crystal 42 or to a pull-up resistor 152 to a positive supply potential. If the pins $43_{in}$ and $43_{out}$ are connected to the crystal 42, the crystal oscillator 14 is enabled and present within the IC and ostensibly generating clocking pulses. However, if the pin 43in is connected through the resistor 152 to the positive supply, the crystal 42 is not present, and the crystal oscillator 14 is inactive. The input pin 43in is monitored by a flip-flop 154 which divides the crystal clock signal, if present, by two. Two D flip-flops 156 and 158 connected in tandem serve to synchronize the f/2 crystal clock signal to the ring oscillator signal on the path 34. The ring oscillator clock must be greater than the crystal frequency for proper sampling, and thus the clocking of the synchronizer flip-flops 156 and 158 occurs from the path 34 rather than from the path 20. Alternatively, the circuit 154 could divide the crystal clock by four, and the ring oscillator output clock on the path 20 can be used.

A detection state machine 160, also clocked by the 2f ring oscillator clock on the path 34 will detect synchronized crystal oscillator pulses when the crystal oscillator 14 is operating. The detection state machine 160 may be a simple four-state machine which advances through its states providing no clocking pulses are received from the synchronizer, but will reset back to its zero state whenever a zero (0) pulse is received. A zero pulse would occur if the crystal oscillator were fully implemented and operating. Also, it should be noted in passing that the state machine 160 will cover a case of recovery from a failed crystal oscillator (i.e. the system could still function even if the crystal stopped working, once POR was cycled, but this would normally be a very rare failure mode. An output latch 162 is open during e.g. a power-on reset (POR) sequence, and closes when POR completes. If the crystal oscillator 14 is implemented and operating at POR, this fact will be readily determined by the detector circuit 50 and signaled on a path 164 to other elements of the IC such as the control logic 24, which can then take appropriate action to obtain the benefits of the crystal oscillator 14 as well as the ring oscillator 12, as discussed above.

Figure 6:
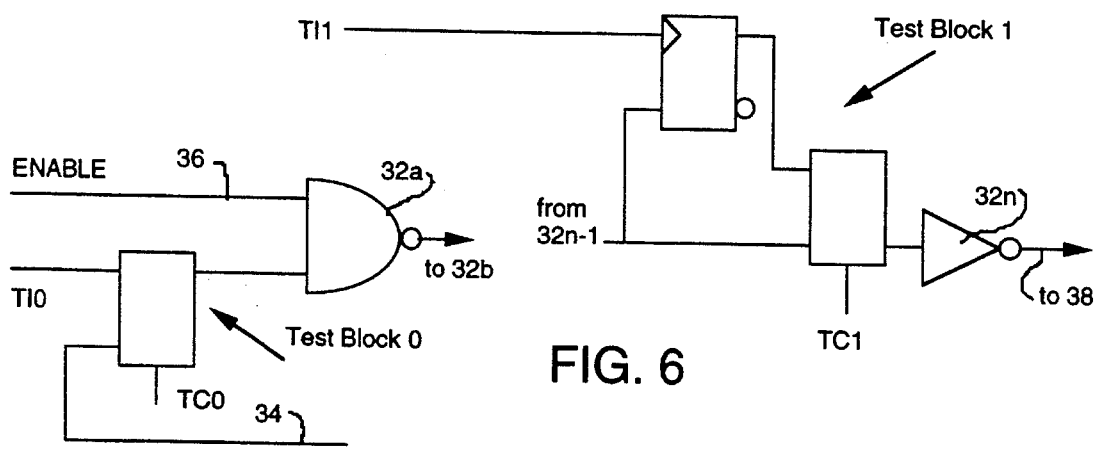
FIG. 6 is a simplified block diagram of a test circuit for fault-testing the ring oscillator of FIG. 1 during manufacturing, in accordance with aspects of the present invention.

Fault testing of the ring oscillator circuit 12 is important in order to ensure a manufacturable design. Many designs which are eminently feasible in the lab are unsuitable for mass production. This is especially true in the area of digital ICs, where the manufacturing tester's capabilities are specialized and limited. The ring oscillator 20 is essentially an analog and dynamic circuit, which needs to be tested in a digital and static manner. It is important to provide suitable techniques for accomplishing such testing. FIG. 6 provides one example. FIG. 6 illustrates two test blocks, test block 0 and test block 1. These test blocks 0 and 1 are implemented within the ASIC 10 which also includes the clock circuits 12 and 14, and related circuitry.

The circuit elements in FIG. 6 will fault-test the ring oscillator 12. Test block 0 is used to fault-test the delay elements 32a to 32a; and, test block 1 is used to fault-test the ring oscillator feedback path 34 (in this regard test block 1 can be located anywhere between elements 32a and 38 of FIG. 1). The test logic shown is intended to achieve a minimal additional gate count within ASIC 10, but requires greater test complexity in order to cause the circuit to obtain a proper state for testing. Additional test logic (i.e. multiplexed test outputs to ASIC 10 external pins) will ease the vector sequence complexity. The test inputs are easiest to work with if they are directly connected to IC input pins during a test mode.

A fault-test sequence may include the following steps:

1. assert ASIC 10 POR;
2. assert TC0 (test mux zero asserts test input zero), de-assert TC1; de-assert POR;
3. cycle through test vectors until ENABLE becomes active;
4. toggle TI0 input with test vectors to simulate feedback (circuit block 38 should respond as expected);
5. assert TC1 to select test block 1 test circuitry, then de-assert TC0; and,
6. toggle TI1 input with test vectors to simulate feedback (circuit block 38 should respond as expected).

Note that the clock at block 38 will toggle at the same rate as TI0 and will toggle at one half the rate of TI1. It is also desirable to test the crystal oscillator clamp circuit 48 for functionality as part of the manufacturing process. The crystal oscillator clamp circuit 48 can be tested by connecting a pullup resistor to the clock oscillator input (such as resistor 152 shown in FIG. 1) and test for transitions at the crystal oscillator output 22 as the DISABLE signal to the clamp circuit 48 is asserted and de-asserted.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for rapidly generating clocking signals with clocking circuitry of a digital logic circuit during a clock recovery interval and thereafter, comprising the steps of:

applying a clock enable signal to the clocking circuitry, generating and putting out secondary clocking pulses from a free-running secondary clock oscillator within the clocking circuitry during the clock recovery interval, generating primary clocking pulses from a frequency-stabilized master oscillator within the clocking circuitry during the recovery interval and thereafter, timing duration of the recovery interval by reference to the secondary clock pulses, selecting and putting out the primary clock pulses following the recovery interval.

2. The method set forth in claim 1 wherein the step of selecting and putting out the primary clock pulses following the recovery interval comprises the further step of switching from the secondary clock pulses to the primary clock pulses without generating any glitches.

3. The method set forth in claim 1 comprising the further step of setting an output clocking frequency of the free-running secondary clock oscillator to be no greater than a maximum clocking frequency of the digital logic circuit.

4. The method set forth in claim 3 comprising the further step of adjusting the clocking frequency of the free-running secondary clock oscillator by periodically monitoring the secondary clocking pulses in reference to the primary clocking pulses.

5. The method set forth in claim 1 wherein the clock recovery interval occurs immediately following a powered-down sleep operating mode of the digital logic circuit.

6. The method set forth in claim 5 wherein the digital logic circuit comprises a computer peripheral data storage device including a RAM buffer connected to a host device, and wherein the step of generating the clock enable signal to the clocking circuitry comprises the steps of receiving a host access request from the host device and generating and applying an ENABLE control signal to start the free-running secondary clock oscillator and to start the frequency-stabilized master oscillator.

7. The method set forth in claim 6 comprising the further step of applying the secondary clocking pulses to respond to the host access request during the recovery interval.

8. The method set forth in claim 1 comprising the further steps of forming the clocking circuitry of a digital logic circuit within an application-specific integrated circuit (ASIC), and testing the clocking circuitry for functionality via test circuitry as part of a manufacturing process for checking out the ASIC.

9. A clocking circuit for rapidly generating clocking signals within a digital logic circuit and comprising:

a free-running secondary clock oscillator within the clocking circuit for generating secondary clocking pulses at least during a clock recovery interval in response to a clock enable signal, a frequency-stabilized primary clock oscillator within the clocking circuit for generating primary clocking pulses beginning during the recovery interval and thereafter during a subsequent operational interval, a timer within the clocking circuit for timing duration of the clock recovery interval by reference to the secondary clock pulses, and a clock signal selector controlled by a control logic block in response to an input from the timer and connected to the secondary clock oscillator and to the frequency-stabilized primary clock oscillator for selecting and putting out the secondary clocking pulses at least during the clock recovery interval and for selecting and putting out primary clocking pulses during the subsequent operational interval.

10. The clocking circuit set forth in claim 9 wherein the timer includes a control logic circuit for monitoring the secondary clocking pulses and for monitoring the primary clocking pulses, for controlling the clock signal selector to switch from the secondary clocking pulses to the primary clocking pulses without generating any glitches.

11. The clocking circuit set forth in claim 9 wherein the free-running secondary clock oscillator comprises a ring oscillator comprised of a chain of delay gates having a net polarity inversion, the ring oscillator having a clock period related to the primary clocking pulses of the frequency-stabilized primary clock oscillator.

12. The clocking circuit set forth in claim 11 wherein the ring oscillator further comprises at least one frequency-divider flip-flop for equalizing duty cycles of the secondary clocking pulses and for dividing frequency of the secondary clocking pulses to be no greater than a frequency of the primary clocking pulses.

13. The clocking circuit set forth in claim 9 comprising a pulse monitoring circuit for periodically monitoring the secondary clocking pulses in reference to the primary clocking pulses and for adjusting the clocking frequency of the free-running secondary clock oscillator.

14. The clocking circuit set forth in claim 13 wherein the pulse monitoring circuit comprises a programmed digital microcontroller connected to the digital logic circuit.

15. The clocking circuit set forth in claim 9 wherein the digital logic circuit comprises a computer peripheral data storage device including a RAM buffer connected to a host device via a host interface circuit, and further comprising a clock enable generation circuit within the host interface circuit for receiving a data access request from the host and for generating and for applying an ENABLE control signal to start the free-running secondary clock oscillator and to start the frequency-stabilized primary clock oscillator.

16. The clocking circuit set forth in claim 15 wherein the logic circuit operates in accordance with a sleep mode in which the secondary clock oscillator and the primary clock oscillator are stopped and wherein the host interface circuit includes decode circuitry for decoding a host command for access to the RAM buffer and causing the clock enable generation circuit to apply the ENABLE control signal to the secondary clock oscillator, and further comprising a buffer management circuit clocked by the secondary clock oscillator for controlling data retrieval and transfer operations between the RAM buffer and the host during the recovery interval.

17. The clocking circuit set forth in claim 9 further comprising oscillator detection circuitry for detecting operation of the frequency-stabilized primary clock oscillator and for signaling detection to enable the clock signal selector.

18. The clocking circuit set forth in claim 9 further comprising test circuitry connected to the clocking circuit for testing at least functionality of the free-running secondary clock oscillator.

19. A clocking circuit within an integrated circuit logic chip comprising:

a free-running secondary clock oscillator for generating free-running clocking pulses, electronics for implementing with the aid of an external frequency setting element a frequency-stabilized oscillator for generating frequency-stabilized clocking pulses, oscillator detection circuitry for detecting operation of the frequency-stabilized oscillator, and selection circuitry responsive to the oscillator detection circuitry for selecting between the frequency-stabilized clocking pulses and the free-running clocking pulses, the selected clocking pulses for clocking logic circuitry of the integrated circuit logic chip.

20. The clocking circuit set forth in claim 19 wherein the selection circuitry includes a glitchless multiplexer for selecting between the frequency-stabilized clocking pulses and the free-running clocking pulses during a glitchless switching interval.

21. The clocking circuit set forth in claim 19 further comprising test circuitry connected to the clocking circuit for enabling external testing of functionality of the free-running secondary clock oscillator.

22. The clocking circuit set forth in claim 19 further comprising test circuitry connected to the clocking circuit for enabling external testing of functionality of the electronics for implementing the frequency-stabilized oscillator.

* * * * *